(12) United States Patent
Iotti

(10) Patent No.: US 11,866,303 B2
(45) Date of Patent: Jan. 9, 2024

(54) SAFETY SYSTEM FOR SELF-PROPELLED OPERATING MACHINES

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 1078 days.

(21) Appl. No.: 16/698,123

(22) Filed: Nov. 27, 2019

(65) Prior Publication Data

US 2020/0180916 A1    Jun. 11, 2020

(30) Foreign Application Priority Data

Dec. 10, 2018 (IT) .................... 102018000010918

(51) Int. Cl.

| | | |
|---|---|---|
| *B66C 13/16* | (2006.01) | |
| *B66C 1/40* | (2006.01) | |
| *B66F 17/00* | (2006.01) | |
| *G01G 19/14* | (2006.01) | |
| *G01G 19/18* | (2006.01) | |
| *B66C 23/34* | (2006.01) | |
| *B66C 23/90* | (2006.01) | |

(52) U.S. Cl.
CPC ............... *B66C 13/16* (2013.01); *B66C 1/40* (2013.01); *B66C 23/342* (2013.01); *B66C 23/905* (2013.01); *B66F 17/00* (2013.01); *G01G 19/14* (2013.01); *G01G 19/18* (2013.01)

(58) Field of Classification Search
CPC ......... B66C 13/16; B66C 1/40; B66C 23/342; B66C 23/905; G01G 19/14; G01G 19/18; B66F 17/00
See application file for complete search history.

(56) References Cited

U.S. PATENT DOCUMENTS

| | | | | |
|---|---|---|---|---|
| 3,870,160 A | * | 3/1975 | Hutchings | ................ G06G 7/28 340/685 |
| 4,029,213 A | * | 6/1977 | Thompson | ............ B66C 23/905 340/685 |
| 4,052,602 A | * | 10/1977 | Horn | ...................... B66C 23/905 340/685 |
| 4,054,055 A | * | 10/1977 | Simon | ................... B66C 23/905 340/685 |

(Continued)

FOREIGN PATENT DOCUMENTS

| | | |
|---|---|---|
| CN | 107857212 A | 3/2018 |
| EP | 0036455 A1 | 9/1981 |
| KR | 20180068035 A | 6/2018 |

*Primary Examiner* — Randy W Gibson
(74) *Attorney, Agent, or Firm* — Pearne & Gordon LLP; J. Gregory Chrisman

(57) ABSTRACT

Described is a safety system for a self-propelled operating machine (1) comprises a processing unit (3) which includes: a memory module (31) in which a plurality of load diagrams is stored; a limiting module (32) configured for limiting the operational possibilities of actuators of the machine (1), on the basis of a load diagram; a measuring device (41, 42) for acquiring operating parameters relative to various operating conditions of the operating machine (1); and a selection module (33) configured for selecting from the memory module (31) a load diagram on the basis of an operating parameter acquired by the measuring device (41, 42).

18 Claims, 5 Drawing Sheets

(56) References Cited

U.S. PATENT DOCUMENTS

| | | | | |
|---|---|---|---|---|
| 4,228,681 A | * | 10/1980 | Pruex | B66C 23/905 |
| | | | | 73/862 |
| 5,143,232 A | * | 9/1992 | Stewart | B66C 23/905 |
| | | | | 212/278 |
| 5,263,597 A | * | 11/1993 | Stewart | B66C 23/905 |
| | | | | 212/277 |
| 5,591,943 A | * | 1/1997 | Cheng | B66C 1/40 |
| | | | | 177/229 |
| 6,303,882 B1 | * | 10/2001 | Stephens | G01G 19/14 |
| | | | | 177/184 |
| 8,032,313 B2 | * | 10/2011 | Claxton | E02F 3/30 |
| | | | | 702/42 |
| 8,370,031 B2 | * | 2/2013 | Claxton | G01L 5/101 |
| | | | | 702/42 |
| 2017/0260029 A1 | | 9/2017 | Edeler et al. | |
| 2019/0062130 A1 | * | 2/2019 | Benton | B66C 23/905 |
| 2021/0024332 A1 | * | 1/2021 | Iotti | B66C 13/16 |

* cited by examiner

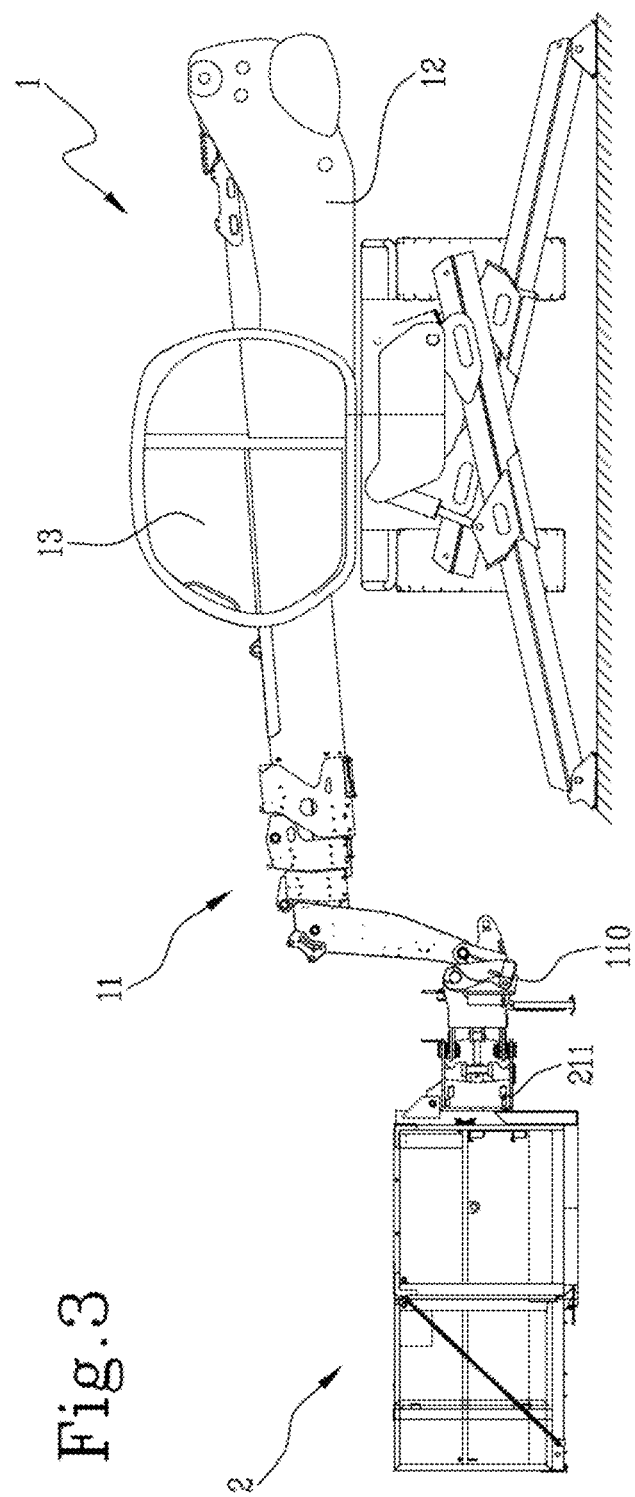

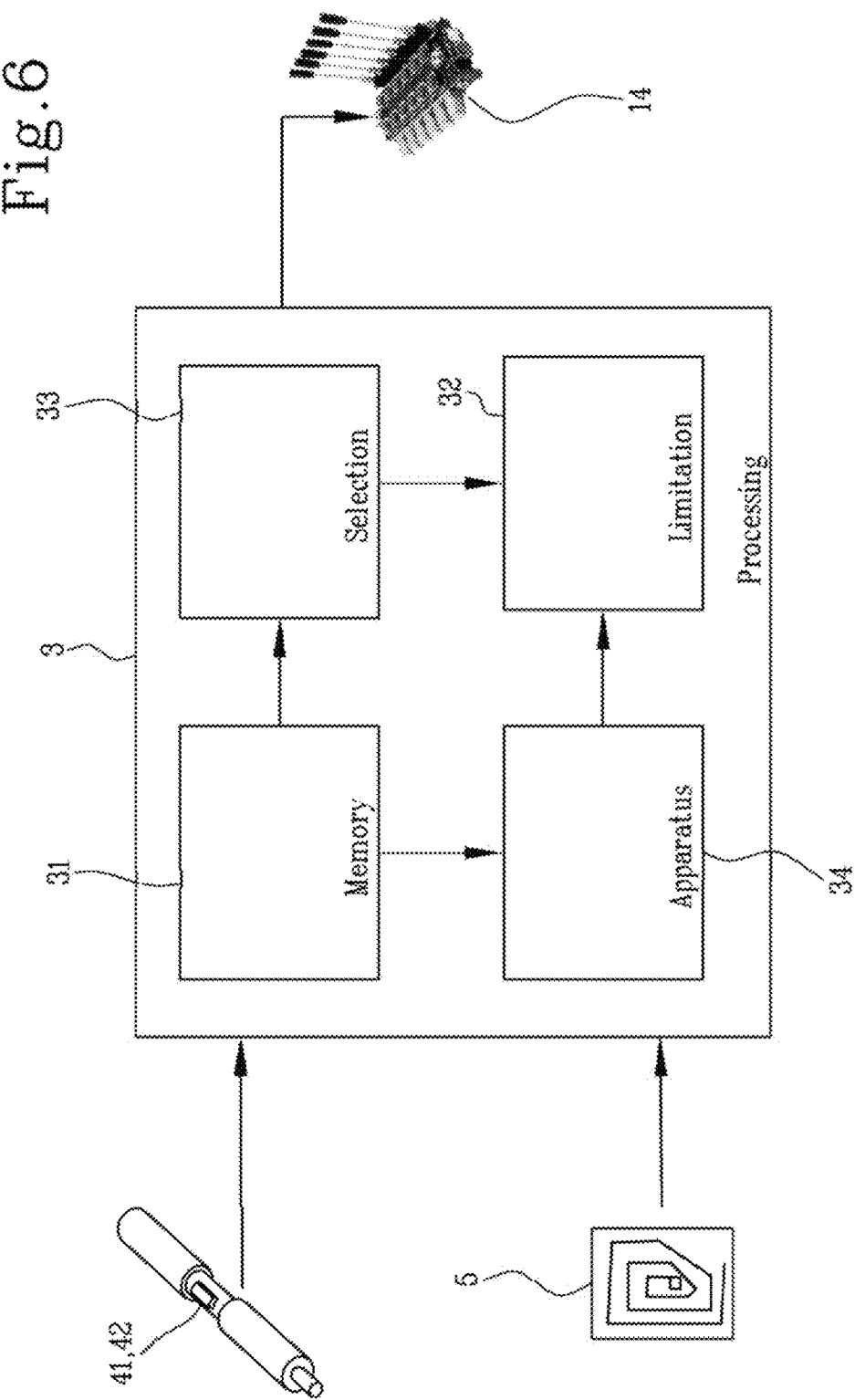

SAFETY SYSTEM FOR SELF-PROPELLED OPERATING MACHINES

This invention relates to an improved safety system for self-propelled operating machines.

More in detail, the invention relates to a safety system for both fixed and rotary telehandlers, which is able to select the load diagrams on the basis of the operating conditions in which the machine is to work.

There are prior art telehandlers consisting of a vehicle equipped with a frame movable on wheels, which mounts the driver's cab and an operating arm which can be extended telescopically; in the rotary machines, the cab and the arm are connected to a platform which is rotatably supported by the frame of the machine.

An apparatus is attached at the distal end of the arm for lifting or moving loads, such as, for example, a fork, a cage, a lateral transfer unit, a hoist, etc.

For several years, telescopic lifting devices have been equipped with electronic stability systems which prevent the occurrence of operating conditions which can lead to instability of the device.

In particular, there are, for example, prior art stability systems which prevent the occurrence of a condition of risk of front instability.

Based on the general configuration of the machine, consequently also its dimensions, weight and geometry, it is possible to obtain the well known load diagram which establishes the spatial boundary within which the arm must be moved, as a function of the load supported, to prevent in advance any risk of instability.

In practice, based on the load to be lifted, the safety system allows or prevents the machine from moving the arm which the operator requests by means of the commands located in the cabin.

However, the operators in this sector have for some time felt the need to have more flexible safety systems than those currently available on the market.

In fact, the prior art safety systems have a very conservative set-up.

For example, with regard to a certain type of cage, designed to carry up to a predetermined weight of the load, the safety systems impose limitations to the movement which are not, on the other hand; imposed for cages which are able to carry lower loads.

The consequence is that companies often the have a plurality of apparatuses, in particular various cages, such as, for example, a cage for carrying both persons and a load and a cage for carrying only persons or work tools, in such a way as to be able to operate with the freedom required for the specific work the machine is required to perform.

In effect, the first type of cage is subjected to a more conservative diagram (see FIG. 1), which allows an arm extension which is less than the second cage, the diagram of which is shown by way of example in FIG. 2.

The limitation of the prior art systems not only concerns the use of cages but also relates to a multiplicity of equipment used by the telehandlers. Consider, for example, that the operators are forced to move the arms (or "jib"), equipped with two or more hooks located at different distances and designed to support different loads, with the same safety limitations regardless of which hooks are used, as well as in the case of arms which can be extended by winch, the movements allowed or prohibited are the same, regardless of whether the arm is extended or retracted and so on.

The technical purpose which forms the basis of the invention is to propose a safety system for self-propelled operating machines which satisfies the above-mentioned need.

The technical purpose specified is achieved by the safety system made according to claim 1, the method actuated according to claim 16 and the computer program according to claim 20.

Further features and advantages of the invention are more apparent in the non-limiting description of a preferred but non-exclusive embodiment of the system proposed, as illustrated in the accompanying drawings, in which;

FIG. 3 is a side view of an operating machine which uses the invention;

FIG. 6 is a diagram representing the processing unit according to the invention.

Figure 2:
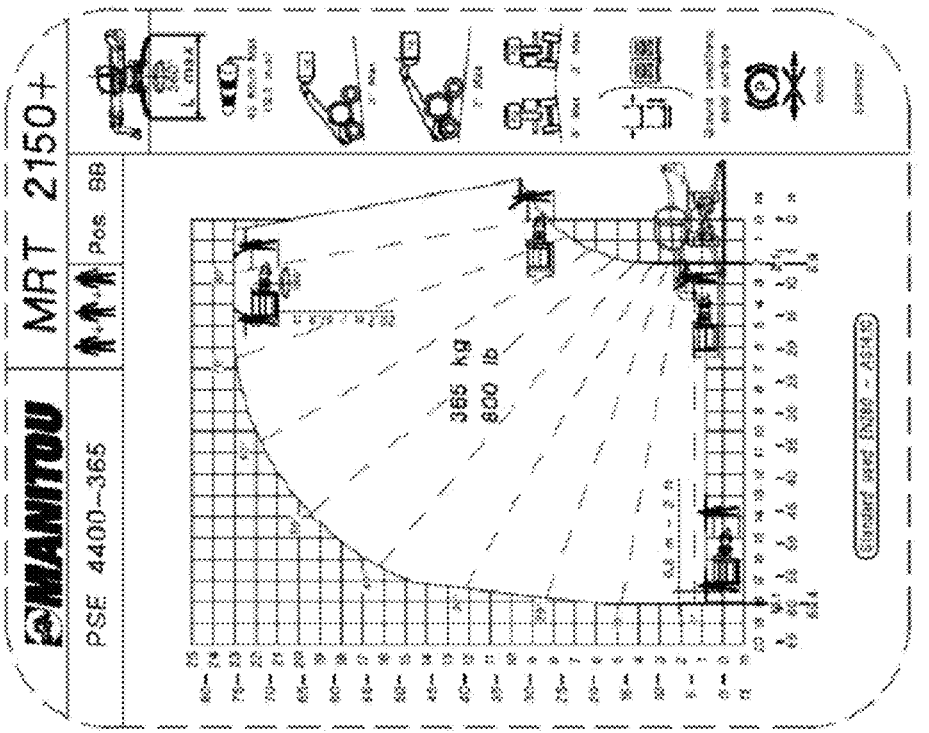
FIGS. 1 and 2 are graphical representations of load diagrams associated with loading cages which can be used by telehandlers.
Figure 1:
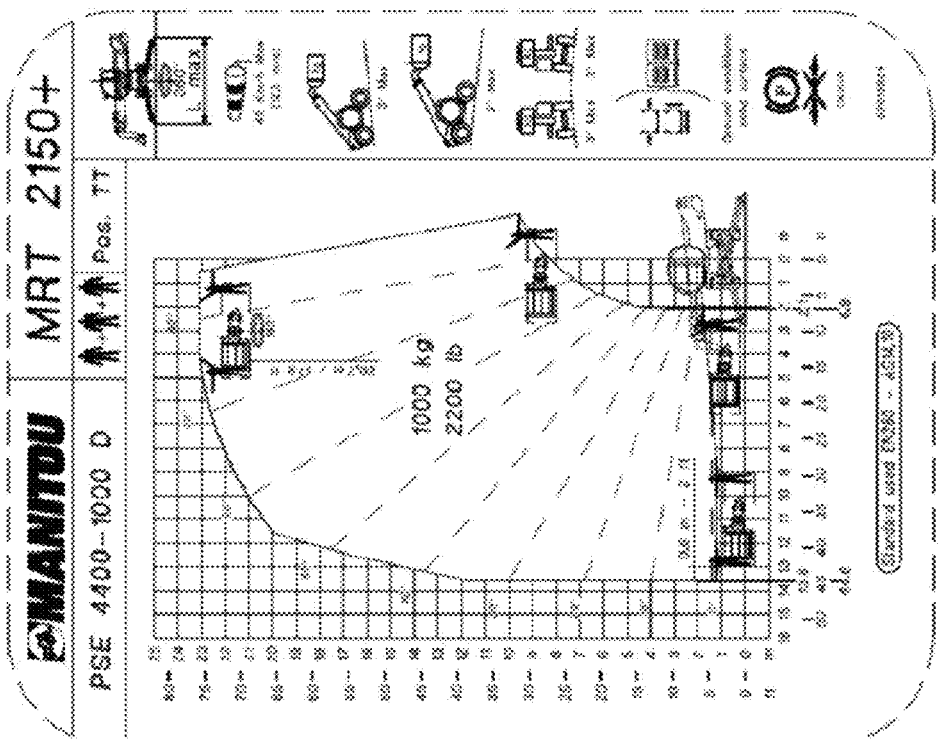

With reference to the accompanying drawings, the numeral 1 denotes in its entirety a self-propelled operating machine which is equipped with the safety system according to the invention.

The machine shown in the drawings is a rotary telehandler 1, equipped with a telescopic lifting arm 11 mounted on the rotatable platform 12, which also has the driver's cab 13, the arm being equipped, at its distal end, with an apparatus 2.

However, it should be noted that the invention can be used with a different type of operating machine, generally equipped with a lifting arm and an apparatus.

For example, the machine in which the invention is implemented may be a fixed telehandler or an articulated telehandler or an operating machine different from telehandlers.

Hereinafter, for convenience of illustration and without limiting the scope of the invention, reference will be made to the particular case in which the operating machine 1 is a telehandler.

The term apparatus 2 means both an accessory for engaging a load, such as a fork, a lateral transfer device, a winch, a gripper, etc. and an accessory for lifting persons and, if necessary, also a load, such as a cage.

Still more in detail, the arm 11 may have, at its distal end, an attachment device 110, also of the type normally in use in the telehandlers made by the Applicant, which allows the replacement of the apparatus 2 and its connection to the hydraulic and electronic apparatuses of the machine.

The arm 11 is articulated to the rotatable platform 12, so as to oscillate vertically, under the actuation of a hydraulic cylinder or similar actuator, between a lower position, substantially horizontal, and an upper position wherein the arm 11 is close to the vertical.

The arm 11 is extensible and retractable and, more precisely, comprises a plurality of segments inserted one in the other, coaxial with each other and designed to translate along the axial direction.

The elongation and retraction of the arm 11 are also produced by one or more hydraulic cylinders, or other actuators.

The rotation of the platform 12 is also produced by a preferably hydraulic actuator, associated for example with a rack, in the same way that it is preferably that the actuator which moves the equipment relative to one or more of its joints is hydraulic.

The hydraulic actuators are subjected to an electro-hydraulic distributor 14, mounted on the machine 1, which is controlled by means of the commands present in the cab 13, according to known methods.

In practice, the machine 1 according to the invention includes a known control system equipped with commands in the cab 13, such as joystick, pedals, pushbuttons, etc., actuated by the operator; by acting on the commands, signals received from the distributor 14 are generated which then adjusts the operation of the actuators of the arm 11, of the apparatus 2 and of the platform 13 (or of other movable elements).

The invention also relates to the case in which the drive actuators are of the electro-mechanical and non-hydraulic type.

The invention is configured as an improved safety system which, like the prior art systems described in the introduction, is correlated with the loads moved and is designed for the safety of the movements of the vehicle 1; in detail, the safety system makes it possible to move the loads in compliance with the load diagrams, of known type, and prevents the occurrence of an instability of the vehicle 1, for example of the front type. According to an important aspect of the invention, the safety system comprises a processing unit 3 which includes a memory module 31 in which is recorded a plurality of load diagrams, or in any case information or instructions corresponding to a plurality of load diagrams.

The processing unit 3 also comprises a limiting module 32 configured for limiting the possibility of operation of actuators of the machine 1 on the basis of a load diagram selected from those of the memory module 31. Generally speaking, it should be noted that, in this description, the processing unit 3 is presented as divided into separate functional modules solely for the purpose of describing the functions clearly and completely.

In practice, the processing unit 3 may consist of a single electronic device, also of the type commonly present on this type of machine, suitably programmed to perform the functions described; the various modules can correspond to hardware units and/or software forming part of the programmed device.

Alternatively or in addition, the functions can be performed by a plurality of electronic devices on which the above-mentioned functional modules can be distributed.

Generally speaking, the processing unit 3 may have one or more microprocessors or microcontrollers for execution of the instructions contained in the memory modules and the above-mentioned functional modules may also be distributed on a plurality of local or remote calculators based on the architecture of the network on which they are housed.

Advantageously, the proposed safety system then includes one or more measuring devices 41, 42 for acquiring operating parameters relative to various operating conditions of the operating machine 1.

The processing unit 3 also includes a selection module 33, which is configured for selecting from the memory module 31 a specific load diagram on the basis of the operating parameter acquired by the above-mentioned measuring device 41, 42, so as to provide to the limiting module 32 the load diagram selected.

In other words, on the basis of the specific operating condition in which the machine 1 is working, which has been referred to during discussion of the prior art, the safety system will apply a particular load diagram to the movements of the machine 1, for example to those of the arm 11, the tower 12 or the apparatus 2, thereby avoiding the limits suffered by the prior art systems.

The operational condition may mean a particular mode of use of the apparatus 2 or the replacement of the apparatus 2 or a particular shape of the ground on which the machine 1 works, or a new configuration of the machine 1, etc.

Hereinafter, by way of example, reference will be made to the case in which the various operating conditions consist of different methods of use of the apparatuses 2 or their change, it being understood that the general inventive concept can also be applied to different aspects.

In practice, the measuring devices according to the invention include or consist of relative sensors 41, 42 which acquire a physical quantity which corresponds to the operating parameter and transmit to the processing unit 3 signals which are a function of the acquisition performed.

For this reason, on the basis of the signal received from the sensor or sensors 41, 42, the processing unit selects the loading diagram selected and consequently commands the distributor 14 which in turn controls the actuators by suitably constraining the movements.

The sensors 41, 42 may be of different types on the basis of the apparatus 2 or the various operating conditions which are provided for by the manufacturer.

Figure 4:
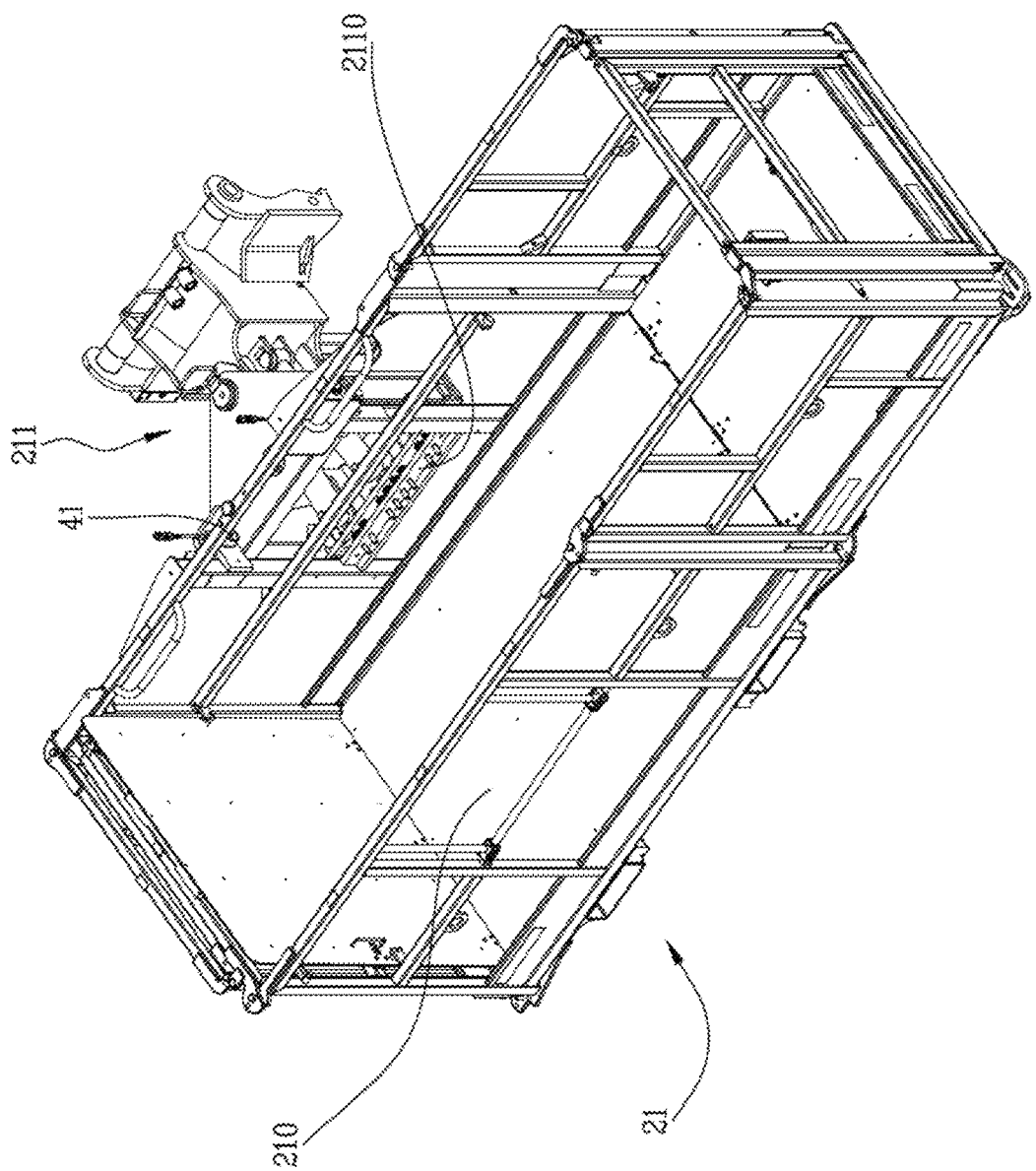
FIG. 4 is a perspective view of a cage which can be used with the invention.

For example, as shown in FIG. 4, there may be a loading cage 21, of the type comprising a bottom surface 210, designed for supporting the operators and/or their work tools, associated with side walls which are located at the perimeter of the surface 210, from which they extend to define a sort of cage open at the top.

The frame 21 is then equipped with an attachment device 211 designed for anchoring to the attachment device 110 of the arm 11, in a known manner.

As shown in FIG. 4, sensors may be included, such as extensometer pins 41, between the attachment device 211 and the rear side wall of the cage 21 and/or sensors may be positioned, such as load cells (not illustrated), at the shock absorbing system 2110 which the attachment device 211 is equipped with.

In this way, on the basis of the load actually measured on the frame 21, the safety system automatically selects the correct diagram, thus avoiding not only operations which are risky for the stability but also excessively stringent limitations.

By using the safety system according to the invention, user companies can avoid purchasing a plurality of "specialised" cages for various activities, for example for transporting only persons or also for transporting a load, with obvious advantages in terms of economic and working efficiency.

It should be noted that the sensors might also be located on the base surface 210 of the frame 21 or at different points on the attachment device 211 or in other positions.

In general, the sensors 41, 42 may be mounted in different positions on the apparatus 2 or even also on the lifting arm 11.

Figure 5:
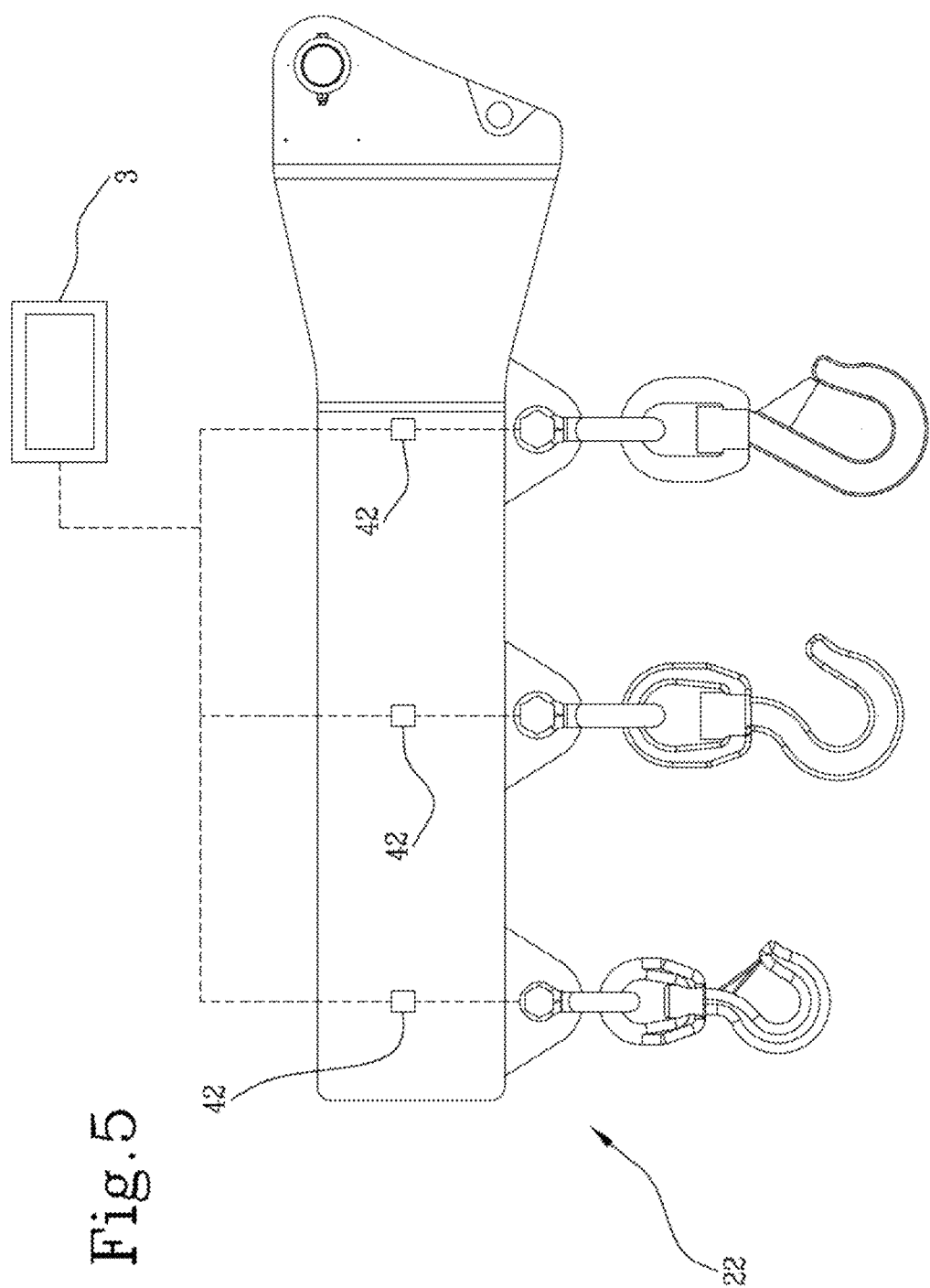
FIG. 5 is a side view of an arm with two or more hooks which can be used with the invention.

If the apparatus is an arm with several hooks 22, such as that shown in FIG. 5, its various hooks may be operatively associated with respective measuring devices, such as load cells 42 or other sensors.

In this way, the invention will select the correct diagram on the basis of the hook which is each time used to perform the lifting activities.

If the apparatus 2 is an extensible arm with a winch, the detection device may be a sensor designed to detect whether the arm is in an extended configuration or in a retracted configuration; the sensor in question may be a position sensor or an encoder associated with a cable fixed to the arm, etc.

It is also possible that the winch of the arm is also associated with a sensor for measuring the load or how much the hook is away from the end of its stroke, that is to say, in its completely raised position, etc.

Moreover, there may be an embodiment of the invention in which, as well as recognising the operating condition of the apparatus 2, it is able to recognise which apparatus 2 is used and therefore select the correct diagram.

In this case, the above-mentioned memory module 31 includes several sets of load diagrams for respective apparatuses, whilst the processing unit 3 also comprises an apparatus module 34 configured for selecting the set from which to select the diagram to be used, on the basis of the apparatus 2 attached to the arm.

For this purpose, the invention may include a device 5 for recognising the apparatus 2 coupled to the arm 11, connected to the processing unit 3 to which the apparatus module 34 is linked.

For example, the recognition device 5 may be designed for wireless communication and operate at radio frequency, such as a RFID or a Bluetooth transceiver or it may use optical technology, such as the reading of a bar code, or a physical connection of the electrical type, by means of jacks, pins or the like.

In this way, as soon as the apparatus 2 is mounted on the attachment device 110 of the lifting arm 11, the safety system recovers the diagram designed for that type of apparatus 2, for example forks rather than a cage, and may also select a specific diagram for particular examples in the context of that type of apparatus, that is to say, the particular cage designed to carry a certain maximum load, or jib with a certain number of hooks etc.

Advantageously, the system according to the invention, for the purposes of selecting the loading diagram, may integrate the recognition of the apparatus 2 with the measurements of the above-mentioned sensors 41, 42.

The invention is also configured as a method for the safety of a self-propelled operating machine 1, in particular of the type described above.

In terms of its general aspects, the method comprises the following steps:
providing a plurality of load diagrams designed to define the operational possibilities of actuators of said machine 1;
measuring at least one operating parameter relative to a predetermined operating condition of said operating machine 1; and
selecting a load diagram based on said operating parameter acquired.

The diagram selected is used to define the behaviour of the actuators which, in particular, control the movement of the apparatus 2.

It should be noted that the functions and features of the machine 1 proposed above, including the functions performed by the processing unit 3 and its modules, correspond to options steps of the method according to the invention.

In particular, the above-mentioned operating parameter may be a load value measured on the apparatus 2 carried by a lifting arm 11 of the machine 1 or a position value measured on the apparatus 2.

Moreover, several sets of load diagrams may be made available for respective apparatuses 2 which can be used by the machine 1, in which case the method comprises recognising the type of apparatus 2 used by the machine 1 and then identifying the set from which to select the diagram to be used, on the basis of the apparatus 2 coupled to the arm 11.

Moreover, the invention also relates to a computer program which, running on a processing unit 3, executes the steps of the method proposed.

The invention claimed is:

1. A safety system for a self-propelled operating machine (1), comprising a processing unit (3) which includes:
    at least one memory module (31) in which is registered a plurality of loading diagrams;
    at least one limiting module (32) configured for limiting the possibility of operation of actuators of the machine (1), based on a load diagram;
    at least one measuring device (41, 42) for acquiring operating parameters relative to various operating conditions of the operating machine (1);
    at least one selection module (33) configured for selecting from the memory module (31) a loading diagram based on an operating parameter acquired from the measuring device (41, 42) wherein the self-propelled operating machine comprises the safety system and a lifting arm having an apparatus for lifting or moving loads, and the at least one measuring device being positioned on the apparatus.

2. A safety system according to claim 1, wherein the measuring device is a load sensor (42).

3. A system according to claim 1, wherein a measuring device is an extensometer sensor (41).

4. A safety system according to claim 1, wherein a measuring device is a position sensor.

5. The system according to claim 1, configured for use with a self-propelled operating machine (1), the lifting arm (11) has attached in a removable fashion a plurality of apparatuses (2), wherein the memory module (31) includes several sets of loading diagrams for respective apparatuses and the processing unit (3) comprises an apparatus module (34) configured to select the set from which to select the diagram to be used, on the basis of the apparatus (2) attached to the lifting arm (11).

6. The system according to claim 5, comprising a device (5) for recognizing the plurality of apparatuses (2) attached to the lifting arm (11) connected to the processing unit (3), wherein the apparatus module (34) is controlled by the recognition device (5).

7. The machine (1) according to claim 1, wherein the at least one measuring device is located on the lifting arm (1).

8. The machine (1) according to claim 1, wherein the apparatus (2) is a loading frame (21), equipped with an attachment and support device (211) connected to a relative rear side and designed for attaching to the lifting arm (11), the at least one measuring device (41) being located on the support device (211).

9. The machine (1) according to claim 8, wherein the at least one measuring device is a load sensor (42), and wherein the loading sensor is positioned on the attachment device (211).

10. The machine (1) according to claim 1, wherein the at least one measuring device is a load sensor (42), and wherein the load sensor is located on a base (210) of a loading frame (21) of the apparatus.

11. The machine (1) according to claim 8, wherein the at least one measuring device are extensometer sensors (41), and wherein the extensometer sensors (41) are positioned between the attachment device (211) and the rear side.

12. The machine (1) according to claim 11, wherein the sensors are extensometer pins (41) which join the attachment device (211) and the respective uprights of a side wall of the frame (21).

13. The machine (1) according to claim 1, wherein the apparatus (2) is an arm with two or more hooks (22), at least two of which are operatively associated with the at least one measuring device (42).

14. The machine (1) according to claim 1, wherein the lifting arm is an extensible arm and one of the at least one of the measuring device is a sensor designed for detecting whether the lifting arm is in an extended configuration or in a retracted configuration.

15. A safety method for a self-propelled operating a machine (1), comprising the steps of:
   providing a plurality of load diagrams designed to define the operational possibilities of actuators of the machine (1), the plurality of load diagrams being for respective apparatuses (2) attached to a lifting arm which can be used by the machine;
   recognizing the apparatus attached to the lifting arm used by the machine;
   measuring at least one operating parameter with a measuring device on the apparatus, the operating parameter relative to a predetermined operating condition of the operating machine (1); and
   selecting a load diagram based on the operating parameter acquired to be used on the apparatus attached to the lifting arm.

16. The method according to claim 15, wherein an operating parameter is a load value measured on an apparatus (2) carried by a lifting arm of the machine (1).

17. The method according to claim 15, wherein an operating parameter is a position value measured on the apparatus (2).

18. A computer program which, when running on a processing unit (3), performs the steps of the method according to claim 15.

* * * * *